United States Patent [19]
Martin

[11] 3,792,877
[45] Feb. 19, 1974

[54] MULTIPLE IMPLEMENT COUPLING STRUCTURE

[76] Inventor: William E. Martin, c/o Martin Co., P.O. Box 187, Kewanee, Ill. 61443

[22] Filed: June 23, 1972

[21] Appl. No.: 265,463

[52] U.S. Cl. ...... 280/415 A, 280/460 R, 280/461 R
[51] Int. Cl. ............................................. B60d 1/10
[58] Field of Search ........ 280/415 A, 434, 460, 461

[56] References Cited
UNITED STATES PATENTS

| | | | |
|---|---|---|---|
| 2,910,307 | 10/1959 | Jennings | 280/460 R |
| 2,500,064 | 3/1950 | Foster | 280/460 R |
| 2,850,292 | 9/1958 | Holland | 280/434 |
| 3,052,487 | 9/1962 | Harbers et al. | 280/434 X |

Primary Examiner—Leo Friaglia

[57] ABSTRACT

Power operated latches are associated with each of a plurality of traction vehicle coupling axes for securing multiple implements and traction vehicles in various of horizontal articulating, vertical articulating and rigid, non-articulating coupling modes.

4 Claims, 8 Drawing Figures

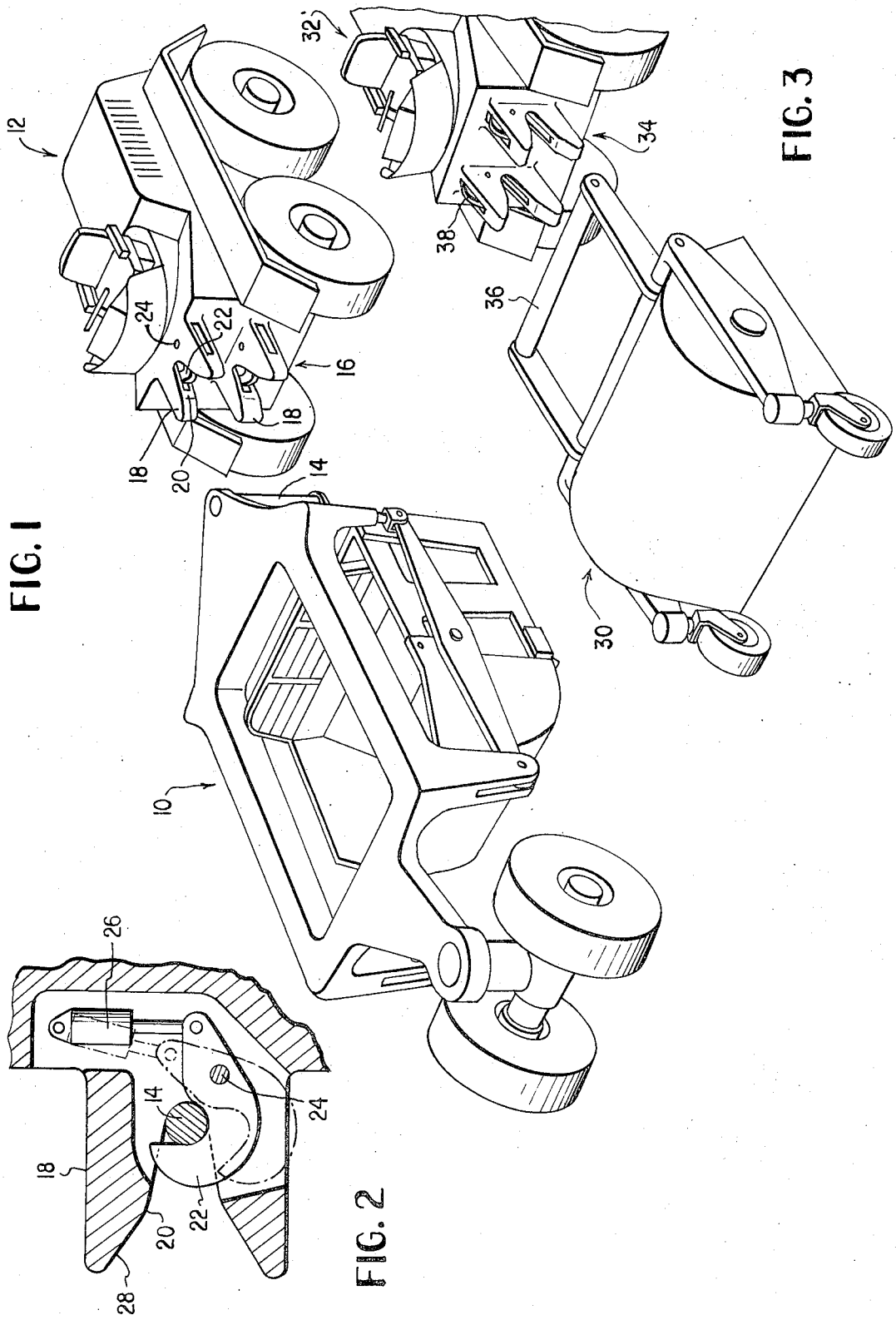

MULTIPLE IMPLEMENT COUPLING STRUCTURE

BACKGROUND OF THE INVENTION

The invention relates to off-road earth working equipment of the type employing separate traction and implement units.

Many earth moving implements are necessarily interconnected with their traction units through pivot connections permitting relative articulation in a vertical plane while others conventionally employ coupling structure permitting articulation in a horizontal plane. Dozers, front end loaders, rototillers and the like exemplify the former while the usual pusher-type scraper typifies the latter. In either case, it is desirable that the axis of articulation be defined by the coupling between the implement and traction units in a manner susceptible of standardization among a plurality of such units. Some of the advantages, such as a smaller traction unit inventory requirement for various implements, are obvious while others are less apparent and relate to the relatively smaller cost saving realized by the elimination of one of two separable connections, i.e. coupling and articulating connections. Thus, typically, a dozer implement frame may be rigidly interconnected with a tractor while the blade subframe is articulated on the main frame.

One of the greatest impediments to widespread acceptance of substitute implement constructions for use with a single traction unit and, indeed, of the use of separable connections of any type where they could be avoided has been the substantial labor requirement to effect such connections. In this regard it must be borne in mind that it is not sufficient, in effecting a separable coupling between the massive type earth moving equipment herein contemplated, to simply drop one or more coupling pins into a place. Coupling and/or articulating axes must be well defined as by large trunnion bearings or the like. A further disadvantage, particularly in those instances where the articulating axis is distinct from the coupling axis, is that rigidly related interconnecting structure in the nature of pins, bolts and the like tend to freeze in place.

The foregoing relates to the coupling of articulated units, in general, whether the same be pivoted about a vertical axis for articulation in a horizontal plane or pivoted about a horizontal axis for articulation in a vertical plane. The prior art has not previously recognized that the same traction unit may be used to provide a common coupling/articulating axis along either of orthogonal axes depending upon which plane of articulation is required for a particular implement. For example, even in the case of manually effected connections, the same traction unit has not previously been available for selective coupling about either a horizontal or vertical axis so as to permit either vertical or horizontal articulation of the attached implement.

In addition to the foregoing, many of the larger earth movers require a rigid, as opposed to articulated, connection between the implement and traction units. Exemplary are motor patrol graders and special scraper constructions of the type described in Applicant's copending Application Ser. No. 235,543 filed Mar. 17, 1972.

The basic objects of the invention are threefold:

1. to provide coacting coupling structure between implement and traction units to define a common pivot axis serving both as a coupling and axis of articulation in conjunction with power operated latching means for maintaining the coupling connection which may be effected from the operator's station. The pivot axis may be oriented either vertically or horizontally depending upon the particular implement or implements to be employed with the same traction unit;

2. to provide a traction unit having coupling structure adapted to coact with either horizontally or vertically oriented coupling structure on the implement unit to expand the range of implement units that may be employed with a single traction unit; and 3. to provide selectively usable implement coupling structure that may provide for either of the vertical or horizontal articulating modes just described; or may be used to effect a rigid interconnection between implement and traction units.

SUMMARY OF THE INVENTION

In one embodiment of the invention, a traction unit is provided with spaced coupling means defining a vertical coupling axis adapted to receive a vertically oriented coupling pin carried by an implement unit. Power operated latches mounted on the traction unit are operable from the operator's station to latch the coupling pin along the coupling axis to effect an intervehicle coupling about which the vehicles may undergo articulation in a horizontal plane. Similarly, in an analogous embodiment, a traction unit includes spaced coupling means defining a horizontal coupling axis adapted to receive a horizontally oriented coupling pin carried by an implement unit. In this latter embodiment, also, remote actuation of associated power operated latches effects an intervehicle coupling. The coupling in the latter case permits relative articulation in a vertical plane.

In each of the instances just described, a single traction unit is selectively usable with a plurality of implement units subject only to the requirement that the articulating mode between the traction unit and the various implements to be used therewith is common. Thus, in the first enumerated instance, the traction unit may only be used where the desired mode of articulation is in a horizontal plane thus necessitating a second traction unit to power different implements whose relative articulation must take place in a vertical plane.

A further modification of the invention involves a modified traction unit provided with spaced coupling pairs defining orthogonal coupling axes wherein each pair is selectively usable to couple the tractor to an implement equipped with either a horizontal or vertical coupling pin. This allows the same tractor to be coupled with an implement in either a vertical or horizontal articulating mode.

A final embodiment relies upon the use of a traction unit of the type just described having orthogonal coupling axes in combination with one of two implement coupling attachments. One of these replaceable, implement coupling attachments may be oriented to coact with one or the other of the orthogonal coupling axes on the tractor to permit of either vertical or horizontal articulation while the other attachment may be latched along both coupling axes to define a rigid interconnection between the vehicles.

DESCRIPTION OF THE DRAWINGS

FIG. 1 is a perspective illustration of an uncoupled traction/implement unit pair with the power operated latches on the traction unit illustrated in locked position;

FIG. 2 is a partly sectioned, detail elevation of a power operated latch and associated coupling structure;

FIG. 3 is a perspective view of a modified, uncoupled traction/implement unit pair showing the latches in an open position;

DESCRIPTION OF THE PREFERRED EMBODIMENTS

Figure 4:
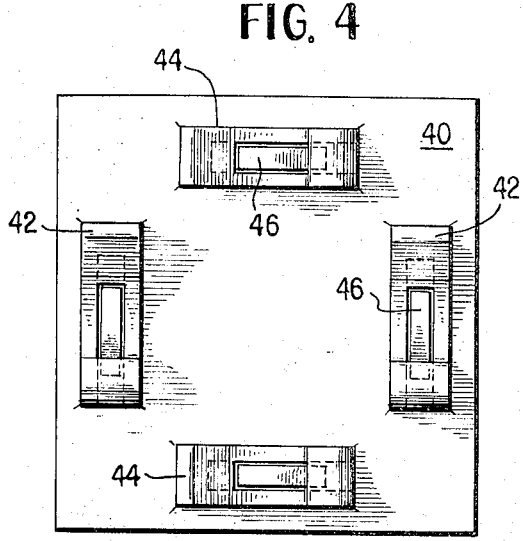
FIG. 4 is a front elevation of a further modified traction unit employing coupling structure defining perpendicularly related coupling axes.

In FIG. 1 is illustrated an implement vehicle 10 in the form of a large capacity scraper adapted to be coupled to traction vehicle 12 for relative articulation in a horizontal plane through the intermediary of coacting coupling structure 14, 16 on the implement and traction vehicles, respectively. Tractor coupling structure 16 comprises vertically spaced coupling lugs 18 having V-shaped notches 20 opening outwardly thereof to receive the vertical pivot trunnion comprising implement coupling structure 14. The spaced notches 20 thus define a vertical coupling axis, the precise position of which axis is determined by the diameter of pivot trunnion 14 and the dimensions of notches 20. Each coupling lug 18 is slotted, as best shown in FIG. 2, to receive a latch 22 which is mounted for limited pivotal movement about pivot pin 24 into and out of latching engagement with pivot trunnion 14 under the influence of a double acting ram 26.

Starting from the position of FIG. 1, the coupling operation is effected by the operator first retracting rams 26 to move latches 22 to the dotted line position of FIG. 2. The tractor is then driven forwardly until pivot trunnion 14 bottoms in coupling lug notches 20 as shown in FIG. 2. Rams 26 are then extended to move the latches to the solid line position of FIG. 2. The vehicles are now intercoupled for relative articulation about the vertical coupling axis defined by notched lugs 18. Decoupling is accomplished by retracting rams 26 and backing the tractor away from the implement.

It is apparent that notches 20 may be further flared, outwardly thereof as at 28, to permit of greater misalignment between the tractor and implement during the coupling approach to further insure that the entire coupling operation may be effected, without assistance, from the operator's station.

In FIG. 3 is illustrated a rototiller implement 30 as exemplary of those implements which require a vertical articulating mode relative to a tractor 32. The coupling structure 34 on tractor 32 is identical to that of tractor 12 except for the horizontal spacing of the same to define a horizontal coupling axis which coincides with the axis of pivot trunnion 36 on rototiller 30 when the same are engaged and latches 38 are rotated to the locked position.

Although the single traction unit 12 may be used with a variety of implements having an appropriately positioned, vertical pivot pin and the tractor 32 may be selectively used with a plurality of implements which articulate about a horizontal axis; two tractors are yet required if the implement usage range is to include both vertically and horizontally articulating implements.

A modification of the tractor coupling structure (FIG. 4) to combine the coupling lug arrangements shown in FIGS. 1 and 3 makes it possible to use a single tractor to propel either of the implements shown in FIGS. 1 and 3 as well as any other articulating implement having an appropriately positioned pivot trunnion. The front of a tractor 40 is shown, in FIG. 4, as including both horizontally and vertically spaced coupling lugs 42, 44 which are substantially identical to those of FIGS. 1 and 3, respectively. The usual power operated latches 46 are, of course, associated with each coupling lug. It will be apparent that the orthogonal coupling axes defined by the arrangement of FIG. 4 may be used to selectively couple the tractor to either of the implements 10 or 30. Thus if implement 10 is to be propelled by tractor 40, latches 46 associated with the vertically spaced coupling lugs 44 are retracted and the tractor is driven into coupling engagement with pivot trunnion 14. The latches are thereafter moved to the solid line position of FIG. 2 and the coupling operation is complete. Similarly, implement 30 may be coupled with tractor 40 along the horizontal coupling axis defined by lugs 42.

Although the problem does not exist in the case of the implements 10 and 30; in the construction of some implement vehicles, the presence of the coupling lugs 42 or 44 which were not being used with the particular implement would tend to restrict the degree of relative articulation between the vehicles. Therefore, it is desirable that there be standardized implement coupling structure which may cooperate with the coupling structure of tractor 40 and not be subject to the limitation. Additionally, and more importantly, it is desired to permit of effecting a non-articulating rigid connection between certain implements and their propelling vehicles for reasons more clearly spelled out in Applicant's aforesaid copending application, Ser. No. 235,543. That coupling structure illustrated in FIGS. 5-8 permits any implement 48 provided with a specially constructed tongue 50 and one of two removable coupling attachments 52, 54 to coact with the tractor coupling structure of FIG. 4 in such a manner as to permit any of a rigid intercoupling, horizontal articulating mode and vertical articulating mode.

The outer flat face 56 of tongue 50 is recessed along orthogonal axes to produce intersecting, horizontal and vertical recesses 58, 60, respectively, whose dimensions are chosen to seat the removable attachments 52, 54. A socket 62 extends inwardly of tongue 50 from the intersection of recesses 58 and 60 and a bore 64, for the receipt of locking pin 66, extends downwardly from the upper surface of the tongue to intersect socket 62.

The removable attachment or adapter 52 includes oppositely disposed arms 68 of such length as to bridge either spaced pair of coupling lugs 42, 44 on the tractor depending upon the orientation of the attachment. Two short integral stub arms 70 of a length approximately equal to the length of either of the intersecting recesses 58, 60 and a cross-bored locking lug 72 adapted to seat in socket 62 complete the description of attachment 52.

Figure 5:
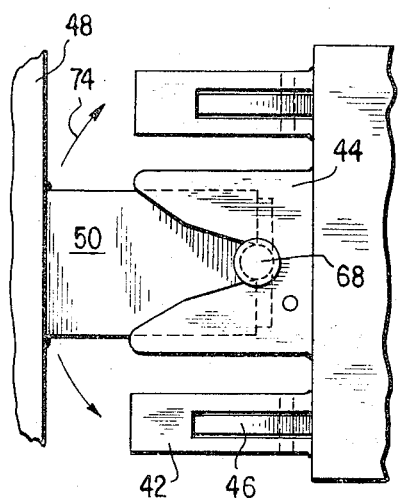
FIG. 5 is a top plan of the traction vehicle coupling structure of FIG. 4 coupled with a modified implement vehicle.
Figure 6:
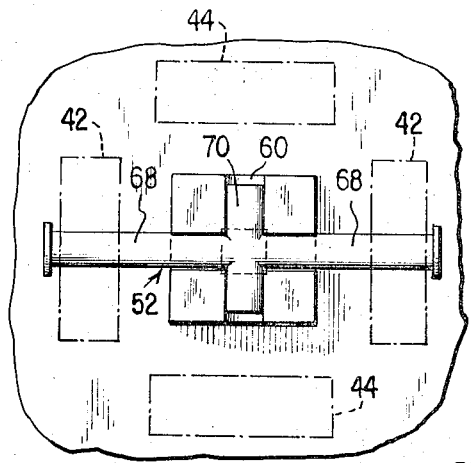
FIG. 6 illustrates, in solid lines, a removable coupling attachment mounted to the end face of the implement coupling tongue shown in FIG. 5 and, in phantom lines, the relative positions of the traction vehicle coupling structure.
Figure 8:
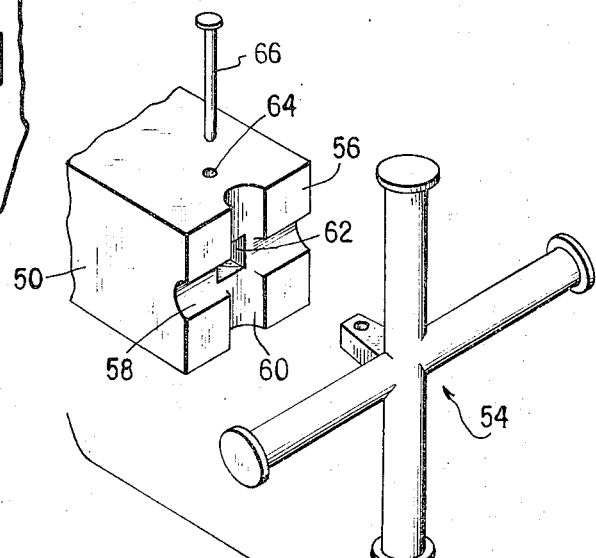
FIG. 8 is an exploded perspective of the implement tongue of FIGS. 5-7 and a modified coupling attachment.
Figure 7:
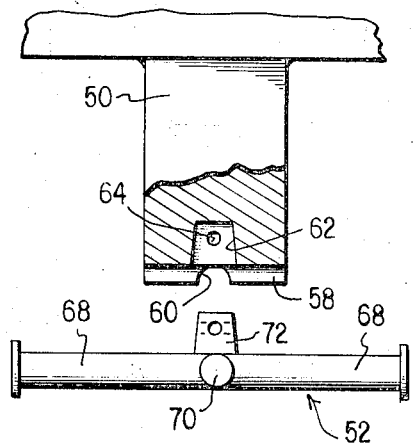
FIG. 7 is an exploded top plan view of the implement tongue and coupling attachment of FIG. 6.

As will be apparent from a comparative inspection of FIGS. 5 and 6, attachment 52 may be oriented with the long arms 68 thereof defining a vertical pivot trunnion to coact with coupling lugs 44 or, as in FIG. 6, with arms 68 seated in horizontal tongue recess 58 to define a horizontal pivot trunnion to coact with coupling lugs 42. The attachment is firmly seated in either of the positions of FIGS. 5 and 6 by virtue of the coacting recessed and socketed tongue construction and the corresponding mating portions of attachment 52. The attachment is locked in the selected position by insertion of pin 66 through bore 64 and into one of the cross-bores (FIG. 7) in locking lug 72. Thus, it will be apparent that by selective orientation of attachment 52, the single tractor 40 may be coupled with an implement for relative articulation in either of vertical or horizontal planes.

When it is desired to rigidly intercouple the vehicles, attachment 52 is removed and the attachment 54 is substituted therefor. Attachment 54 is substantially identical to attachment 52 except that the stub arms are replaced with two longer arms to define both horizontal and vertical pivot trunnions.

Following assembly of attachment 54 with tongue 50, latches 46 on tractor 40 would be retracted and the tractor driven forwardly until all four arms on attachment 54 bottom in coupling lugs 42, 44. All four latches are thereafter moved to the latched position to effect a rigid coupling between the vehicles.

It is, of course, apparent that the relative outward extent of coupling lugs 42, 44 could be shortened from the relative dimensions shown in FIG. 5 if a greater articulating arc than that indicated by arrows 74 is desired. Alternatively, the tongue 50 could be lengthened.

I claim:

1. In combination with an implement and traction unit pair, the improvement comprising; coupling pin means carried by said implement and defining a coupling pin axis along at least one of orthogonal axes; spaced pin receiving coupling means carried by said traction unit and defining at least one coupling pin receiving axis parallel to said coupling pin axis; latching means mounted on said traction unit for movement toward and away from said coupling pin axis for selectively latching said coupling pin means in engagement with said pin receiving coupling means when said coupling pin and coupling pin receiving axes are coincident; power means carried by said traction unit for operating said latching means; said coupling pin means defining orthogonal pin coupling axes and said pin receiving coupling means defining orthogonal coupling pin receiving axes; and said latching means being mounted for movement toward and away from said pin receiving coupling means for rigidly intercoupling said vehicles.

2. In combination with an implement and traction unit pair, the improvement comprising; coupling pin means carried by said implement and defining a coupling pin axis along at least one of orthogonal axes; spaced pin receiving coupling means carried by said traction unit and defining at least one coupling pin receiving axis parallel to said coupling pin axis; latching means mounted on said traction unit for movement toward and away from said coupling pin axis for selectively latching said coupling pin means in engagement with said pin receiving coupling means when said coupling pin and coupling pin receiving axes are coincident; power means carried by said traction unit for operating said latching means; and said coupling pin means and coupling pin receiving axes including both vertical and horizontal coupling pin means and coupling pin receiving axes.

3. Traction vehicle coupling structure adapted for coaction with one of a plurality of implement vehicles having coacting coupling structure comprising; first spaced coupling means mounted on said traction vehicle defining a horizontal coupling axis; second spaced coupling means mounted on said traction vehicle defining a vertical coupling axis; and power operated latching means mounted on said traction vehicle for selective latching movement toward and away from each of said axes whereby coacting coupling structure on one of said implement vehicles may be latched for articulating movement of an implement about one of said axes.

4. In combination with a traction and implement unit pair, the improvement comprising; coupling means mounted on said implement defining a single coupling axis lying along one of perpendicularly related axes; first coupling means mounted on said traction unit defining a second coupling axis substantially parallel to said single coupling axis on said implement; second coupling means mounted on said traction unit defining a third coupling axis substantially at right angles to said second coupling axis for alternative coupling with implements having coupling means defining a coupling axis lying along the other of said perpendicularly related axes; and power operated latching means mounted on said traction unit for latching said first and second coupling axes in coincidence.

* * * * *